United States Patent
Mikkelsen

(10) Patent No.: US 9,593,673 B2
(45) Date of Patent: Mar. 14, 2017

(54) WEAR SENSOR FOR A WIND TURBINE

(71) Applicant: SIEMENS AKTIENGESELLSCHAFT, München (DE)

(72) Inventor: Jens Arne Mikkelsen, Herning (DK)

(73) Assignee: SIEMENS AKTIENGESELLSCHAFT (DE)

( * ) Notice: Subject to any disclaimer, the term of this patent is extended or adjusted under 35 U.S.C. 154(b) by 563 days.

(21) Appl. No.: 14/096,144

(22) Filed: Dec. 4, 2013

(65) Prior Publication Data

US 2014/0314564 A1   Oct. 23, 2014

(30) Foreign Application Priority Data

Apr. 23, 2013 (EP) ..................... 13164943

(51) Int. Cl.
  *F03D 11/00*   (2006.01)

(52) U.S. Cl.
  CPC .......... *F03D 11/0091* (2013.01); *F03D 17/00* (2016.05); *F05B 2240/50* (2013.01)

(58) Field of Classification Search
  CPC ........ F03D 9/25; F03D 17/00; F05B 2260/82; H02K 7/08
  See application file for complete search history.

(56) References Cited

U.S. PATENT DOCUMENTS

| | | | | |
|---|---|---|---|---|
| 4,641,978 A * | 2/1987 | Kapich | .................. | F01D 25/16 310/90.5 |
| 5,602,437 A * | 2/1997 | Shahamat | ............... | F16C 19/52 310/68 R |
| 5,998,894 A * | 12/1999 | Raad | ...................... | F16C 19/52 310/68 B |
| 6,445,099 B1 * | 9/2002 | Roseman | ............... | F16C 19/52 310/68 R |
| 8,786,151 B1 * | 7/2014 | Cole | ..................... | H02K 7/102 310/90 |
| 2011/0293399 A1 | 12/2011 | Dunne et al. | | |
| 2012/0027585 A1 | 2/2012 | Daniels et al. | | |
| 2013/0028736 A1 | 1/2013 | Bauer et al. | | |

OTHER PUBLICATIONS

European Search Report; Application No. 13 16 4943.6; Mail Date: Oct. 18, 2013; Siemens Aktiengesellschaft; 4 pgs.

* cited by examiner

*Primary Examiner* — Ninh H Nguyen

(74) *Attorney, Agent, or Firm* — Schmeiser Olsen & Watts LLP

(57) ABSTRACT

A system comprising a first wind turbine structure and a second wind turbine structure, wherein the first wind turbine structure and the second wind turbine structure are rotatable with respect to each other is provided. A safety bearing element is mounted to the first wind turbine structure such that the second wind turbine structure is in slideable contact with a contact surface of the safety bearing element if a distance between the first wind turbine structure and the second wind turbine structure is reduced below a predetermined reference value. The safety bearing element comprises an electrical indicating circuitry with an indicating conductor, wherein the indicating circuitry is connectable to a wear controller system such that a signal is generatable by the indicating circuitry and transmitted to the wear controller system until the indicating conductor is damaged due to the slideable contact of the second wind turbine structure with the safety bearing element.

14 Claims, 5 Drawing Sheets

WEAR SENSOR FOR A WIND TURBINE

CROSS-REFERENCE TO RELATED APPLICATIONS

The present application claims priority under the Paris Convention to EP application number EP13164943, filed on Apr. 23, 2013, the disclosure of which is hereby incorporated by reference in its entirety.

FIELD OF TECHNOLOGY

The following relates to a system for a wind turbine comprising a safety bearing element with an electrical indicating circuitry and a wear controller system.

BACKGROUND

In general, a wind turbine comprises a hub to which the rotor blades are mounted. The hub is mounted to a rotatable structure of the wind turbine. The rotatable structure rotates around a stator of the wind turbine, wherein the stator is mounted inside a nacelle of the wind turbine. In some embodiments of wind turbines, gear devices are installed to transfer the drive torque induced by the hub to a generator rotor inside a nacelle of the wind turbine.

In other wind turbine embodiments, the so-called direct drive wind turbine design is applied. In a direct drive wind turbine design, no gear devices are used. The drive torque is directly transferred from the hub to the rotatable structure which is directly coupled to a generator rotor of the wind turbine. Hence, in the direct drive wind turbine design, large diameters of the rotatable structure and respective stator parts of stationary structures of the wind turbine, in particular inside the generator, exist.

When a generator rotor of a large direct drive wind turbine is rotating and heavy shifting loads occur, e.g. due to wind gusts, large turbulences and/or if a bearing of the generator of the wind turbine is damaged, then it is important to ensure that there is kept at least a small air gap between the rotatable structure and the stationary structure of the generator. Otherwise, there is a risk that e.g. the generator may be damaged.

SUMMARY

A wind turbine with a safety bearing which is simple to maintain is provided. Another aspect relates to a system for a wind turbine, a wind turbine, and a method of operating the wind turbine.

According to a first aspect, a system for a wind turbine is presented. The system comprises a first wind turbine structure and a second wind turbine structure, wherein the first wind turbine structure and the second wind turbine structure are rotatable with respect to each other. The wind turbine further comprises a safety bearing element which is mounted to the first wind turbine structure such that the second wind turbine structure is in slideable contact with a contact surface of the safety bearing element if a distance between the first wind turbine structure and the second wind turbine structure is reduced below a predetermined reference value.

The safety bearing element comprises an electrical indicating circuitry with an indicating conductor, wherein the electrical indicating circuitry is connectable to a wear controller system such that a signal is generatable by the electrical indicating circuitry and transmitted to the wear controller system until the indicating conductor is damaged due to the slideable contact of the stiffening disc with the safety bearing element.

According to a further aspect, a method for operating a wind turbine is presented. According to the operating method, a first wind turbine structure is rotated relative to a second wind turbine structure. The wind turbine further comprises a safety bearing element which is mounted to the first wind turbine structure such that the second wind turbine structure is in slideable contact with a contact surface of the safety bearing element if a distance between the first wind turbine structure and the second wind turbine structure is reduced below a predetermined reference value. The safety bearing element comprises an electrical indicating circuitry with an indicating conductor, wherein the electrical indicating circuitry is connectable to a wear controller system such that a signal is generatable by the electrical indicating circuitry and transmitted to the wear controller system until the indicating conductor is damaged due to the slideable contact of the stiffening disc with the safety bearing element.

The second wind turbine structure surrounds the first wind turbine structure, or vice versa. Hence, according to a further exemplary embodiment, the safety bearing element is mounted to a mounting section of the first wind turbine structure, such that a radially outer contact surface of the safety bearing element is in slidable contact with a radially inner surface of the second wind turbine structure. At the predefined reference value of the distance, only the safety bearing element is in contact with the second wind turbine structure and the first wind turbine structure does not contact the wind turbine structure. A gap between the first and second wind turbine structure still exists at the predefined reference value of the distance.

The first wind turbine structure may be a stationary structure being coupled to a generator stator. The stationary structure comprises for example a stator frame (e.g. a bed frame). The second wind turbine structure is a rotatable structure being coupled to a hub of the wind turbine and to a generator rotor. The rotary structure comprises e.g. a stiffening disc. The safety bearing element may be mounted to the stator frame such that the stiffening disc is in slideable contact with the contact surface of the safety bearing element if a distance between the stator frame and the stiffening disc is reduced below a predetermined reference value.

A hub with blades is couplable to the rotatable structure, wherein the rotatable structure comprises the stiffening disc, such as a brake disc. The stator frame comprises a mounting section to which e.g. a caliper brake is mountable such that the stiffening disc is brakeable by the mounted caliper brake. The safety bearing element is mounted to the mounting section such that the stiffening disc is in slidable contact with the safety bearing element if a distance between the mounting section and the brake disc is reduced below a predetermined reference value. A signal is generated to a wear controller system until an indicating conductor is damaged due to the slideable contact of the stiffening disc with the safety bearing element. The safety bearing element comprises the electrical indicating circuitry with the indicating conductor, wherein the electrical indicating circuitry is connectable to the wear controller system.

The wind force attacks the blades of the wind turbine such that the hub rotates around a rotating axis and generates a drive torque. The hub is coupled to the rotatable structure of the wind turbine, wherein the rotatable structure is rotatably coupled to a stationary structure, such as stator frames, of the wind turbine. The rotatable structure comprises a coupling section to which the hub is coupled. Furthermore, the rotatable structure is coupled to a generator rotor indirectly via a gearbox or directly via a direct coupling (i.e. as used in a direct drive wind turbine design). In regular operation, the rotatable structure is coupled to the stationary structure e.g. by roller or ball bearings, wherein, besides the roller or ball bearings, an air gap is formed between the rotational and stationary parts.

The stationary structure is a fixed, non-rotating structure, such as a nacelle or a tower section of the wind turbine. The weight force of the blades, the hub, and the rotatable structure is transferred by the stationary structure to the wind turbine structure, such as the wind turbine tower or the nacelle. In a direct drive wind turbine design, the stationary structure also forms part of the generator stator of the wind turbine. The stationary structure comprises the stator frame which comprises a circular profile and a center axis which may be coaxial to a rotational axis of the rotatable structure.

The rotatable structure comprises e.g. at a first axial end the coupling section to the hub. In particular, at an opposed end along the rotational axis of the rotatable structure, the rotatable structure comprises a stiffening disc, such as a brake disc. Accordingly, the stationary structure comprises at an end section which is an end section of the stationary structure inside the nacelle, a stator frame (e.g. a so-called bed frame).

The stiffening disc, such as a brake disc, and the stator frame (e.g. a bed frame) are located within the nacelle and in particular at respective inner axial end sections of the rotatable structure and the stationary structure, respectively, so that a simple and comfortable accessibility is provided for maintenance purposes. The rotor structure may need a stiffening plate or disc at the far end, i.e. the inner axial end sections of the rotatable structure and/or the stationary structure. In this case, the stiffening plate serves to limit the deflections of the rotor structure.

In particular, if the safety bearing element is mounted to the stator frame (i.e. the bed frame), the safety bearing element is located spaced apart along the center axis from the main (roller) bearings between the rotatable structure and the stationary structure, because the main bearings are typically located close to the hub of the wind turbine. Hence, if wind gusts or other loads act on the blades, a high moment acts on an end region of the rotatable structure which end region is spaced apart from the main bearings because the rotatable structure, i.e. the stiffening disc, and the stator frame have a large lever arm to the main bearings. Hence, it may happen that e.g. during wind gusts, a high bending moment acts on the rotatable structure and/or to the stationary structure such that the distance between the mounting section of the stiffening disc and the stator frame is temporarily reduced below the predetermined reference value. Therefore, it is beneficial to apply in the contact region between the rotary structure and the stationary structure the safety bearing element in order to provide a temporary emergency operation until the turbulences or wind gusts are reduced again.

The safety bearing element may be formed of a rigid material block. A material of the safety bearing element may comprise proper sliding properties such that a sliding contact bearing between the second wind turbine structure, e.g. the stiffening disc, and the safety bearing element is achieved. The contact surface of the safety bearing element may comprise a surface profile and surface shape which are aligned to the corresponding contact surface of the second wind turbine structure, e.g. the stiffening disc. The safety bearing element functions as a wear element which is made of brass, bronze, cast iron, Teflon or nylon.

Between the stationary structure (i.e. the first wind turbine structure) and the rotatable structure (i.e. the second wind turbine structure), and in particular between the stiffening disc and the stator frame, an air gap (clearance) is provided at least under regular operation of the wind turbine, in particular an air gap along a radial direction.

An axial direction describes in the following a direction along the center axis of the stator frame and the stationary structure, respectively, and/or a direction along the rotational axis of the rotatable structure. A radial direction describes a direction which runs through the center axis/rotational axis and which is perpendicular to the center axis/rotational axis. A circumferential direction describes a direction around the circumference around the center axis/rotational axis. The radial direction is perpendicular to the circumferential direction and the axial direction.

If the radial size of the air gap and if the distance (e.g. the radial distance) between the first wind turbine structure (e.g. the stator frame comprising with the (brake) mounting section) and the second wind turbine structure (e.g. the stiffening disc such as the brake disc) is reduced below a predetermined reference value, the safety bearing element gets in sliding contact with the second wind turbine structure, such that the safety bearing element forms a sliding bearing with the stiffening disc (i.e. the rotatable structure). Thus, if the air gap is reduced e.g. due to wind gusts, large turbulences and/or bearing defects, an emergency operation of the wind turbine is still provided by the sliding bearing.

If the safety bearing element is installed in the region of the mounting section (stator frame), a proper accessibility to the safety bearing element is given, and a better accessibility to the safety bearing element is also given for maintenance reasons.

The safety bearing element comprises the electrical indicating circuitry with the indicating conductor. The electrical indicating circuitry is connectable to the wear control system. The wear control system may comprise a control unit which is e.g. spaced apart from the stator frame and mounted to a nacelle of the wind turbine or other parts of the stationary structure. The wear control system gathers and receives all signals which indicate wear of specific components of the stationary structure or the rotatable structure.

The electrical indicating circuitry generates under a normal operation of the wind turbine, i.e. if a gap between the contact surface of the safety bearing element and the stiffening disk exists, a (permanent or pulsed) signal and transmits the signal to the wear controller system.

The indicating conductor of the electrical indicating circuitry is located at a predefined location at or close to the contact surface of the safety bearing element. Hence, if the indicating conductor is broken and damaged due to the slidable contact of the stiffening disk with the (contact surface) of the safety bearing element, the transmitting of the signal to the wear controller system is interrupted. If the wear controller system does not receive the signal from the electrical indicating circuitry, further actions, such as a stop of the wind turbine, may be initiated. Accordingly, the electrical indicating circuitry works as a fail-safe system, wherein the indicating conductor gives a signal back to the wear controller system if the circuitry and hence the indicating conductor is not broken or not worn out. Therefore, it is easy to provide a precise detection of wear as the indicating conductor produces precisely the signal if the wind turbine works under normal operation. Because the electrical indicating circuitry sends a signal to the wear control system under normal operation, it is assured, that the electrical indicating circuitry works correctly and if the signal is interrupted, a malfunction of the wind turbine is detected.

In conventional approaches, a wear controller sends an alarm signal, if a malfunction of the wind turbine occurs. Under normal operation, no signal is generated. Hence, it is not assured, if the conventional wear controller works correctly, because no feedback of the wear controller under normal operation of the wind turbine occurs. In contrast to this, the electrical indicating circuitry permanently sends a signal under normal operation of the wind turbine and if a malfunction of the wind turbine occurs, i.e. if the indicating conductor is broken, the signal is interrupted such that the wear controller system may stop the wind turbine.

In particular, according to a further exemplary embodiment, the indicating conductor is mounted onto the contact surface. Furthermore, in another exemplary embodiment, the safety bearing element comprises a groove which is formed within the contact surface, wherein the indicating conductor is arranged within the groove. Hence, if the indicating conductor is arranged within the groove, a certain amount of wear and abrasion of the safety bearing element is allowed until the indicating conductor breaks and the wind turbine is stopped.

According to a further exemplary embodiment, the indicating conductor is a wire, in particular a strip conductor, a flexprint cable or a ribbon cable. The indicating conductor may be flat, for example less than 0.4 mm in thickness, in particular less than approximately 0.2 mm. The strip conductor may be made of copper. Specifically, the strip conductor and the flexprint cable, comprise a flexible and bendable carrier substrate which envelopes a (e.g. copper) conductor line. The strip conductor and the flexprint cable comprise a thickness lower than approximately 1 mm. By using a flexprint cable, it is possible to let the conductor line follow a specific predetermined curvature, i.e. a specific run along the contact surface. Specifically, the flexprint cable may be located in a mild notch (e.g. the groove) within the contact surface. Hence, if the material around the groove is worn out, the flexprint cable will be damaged. This gives a very precise indication of the wear.

Furthermore, the wear of the strip conductor and the flexprint cable (comprising rectangular cross sections) is better calculable and predictable than wear of a wire with a round cross section. In particular, in case of a contact of the contacting surface with the second wind turbine structure, the surface of the flexprint cable scrapes along the second wind turbine structure. The shell of the flexprint cable abrades and finally the flat conductor within the shell breaks. The abrasion of the shell and the flat conductor may be precisely predictable. Hence, the material and the thickness of the strip conductor and the flexprint cable may be designed such that the strip conductor and the flexprint cable may withstand a contact with the second wind turbine structure for a desired time period, such as approximately 10 minutes of total contact time.

According to a further exemplary embodiment, the indicating conductor is glued or brazed to the safety bearing element.

In a further exemplary embodiment, the wind turbine comprises a fixing screw and the safety bearing element comprises a borehole. The fixing screw is screwable into the borehole for fixing the indicating conductor to the safety bearing element in a detachable manner. Specifically, the fixing screw is electrically conductive such that the fixing screw forms a part of the indicating circuitry.

According to a further exemplary embodiment, a contact section of the safety bearing element into which the borehole is formed is made of an electrically conductive material. Thus, the contact section forms a part of the electrical indicating circuitry and is electrically connectable to the wear controller system.

According to a further exemplary embodiment, an electrically conductive clamping terminal which is mountable to the safety bearing element by the fixing screw is provided. The indicating conductor is clamped between the clamping terminal and the safety bearing element. Hence, a clamping connection is provided, such that the indicating conductor may be exchanged in a comfortable manner. Moreover, the groove, e.g. the mild or casted notch, in the contact surface may predefine a certain curvature or run, e.g. an upwards and downwards curvature or just a straight line upwards and downwards such that a precise and narrowed wear area of the indicating conductor, e.g. at the top part (contact surface) of the curvature, may be exposed to wear.

Accordingly, the indicating conductor, such as a flexprint cable, forms a part of an electrical indicating circuitry which may be built into or attached to a contact surface of the safety bearing element. The safety bearing element may be made of brass, cast iron, Teflon or nylon, so that when the safety bearing element is worn down, the indicating conductor breaks and no signal comes back from the electrical indicating circuitry to the wear controller system. In this case, the wear controller system stops the wind turbine.

According to a further exemplary embodiment, the stiffening disc surrounds the stator frame of the stationary structure. In other words, the stiffening disc comprises an inner opening, into which the stator frame is locatable. In other words, the stiffening disc and hence the rotatable structure is an external rotatable structure with respect to the internal, inner stator frame and stationary structure, respectively.

According to a further exemplary embodiment, the safety bearing element is mounted to the mounting section in a detachable manner. For example, detachable fixing elements, such as screw and bolt connections, may be applied in order to accomplish the detachable mounting of the safety bearing element to the first wind turbine structure. Hence, a proper maintenance is achieved.

According to a further exemplary embodiment, the safety bearing element is formed of a material which is softer than a material of the second wind turbine structure (e.g. the stiffening disc such as the brake disc). Hence, the abrasion occurs exclusively at the safety bearing element which is easy to exchange. In this way, the safety bearing element is worn down instead of the stiffening disc if they slide against each other, e.g. during high loads or bearing failures. Hence, proper maintenance properties of the wind turbine are achieved.

According to a further exemplary embodiment, the wind turbine further comprises a further safety bearing element wherein the first wind turbine structure comprises a further mounting section. The mounting section and the further mounting section are spaced apart along a circumferential direction of the first wind turbine structure, i.e. the stator frame. The further safety bearing element is mounted to the further mounting section such that the second wind turbine structure is in slidable contact with the safety bearing element if a further distance between the further mounting section and the stiffening disc is reduced below a further predetermined reference value. The further safety bearing element may comprise a further electrical indicating circuitry with a further indicating conductor, wherein the further electrical indicating circuitry is connectable to the wear controller system such that a further signal is generatable by the electrical indicating circuitry and transmitted to the wear controller system until the further indicating conductor is damaged due to the slideable contact of the second wind turbine structure with the safety bearing element. By the above-described exemplary embodiment, it is outlined that along the circumferential direction of the first wind turbine structure (e.g. along the stator frame) a plurality of further mounting sections are formed, wherein to one, a couple or to all of the mounting sections respective safety bearing elements may be attached.

Accordingly, a direct driven wind turbine comprises a safety bearing element (air gap securing means) which comprises a contact surface, i.e. an end surface, which radially faces a respective surface part of the second wind turbine structure (e.g. the stiffening disc) which further comprises e.g. a rotatable structure of a (i.e. direct driven) generator of the wind turbine.

Embodiments have been described with reference to different subject matters. In particular, some embodiments have been described with reference to apparatus type claims whereas other embodiments have been described with reference to method type claims. However, a person skilled in the art will gather from the above and the following description that, unless otherwise notified, in addition to any combination of features belonging to one type of subject matter also any combination between features relating to different subject matters, in particular between features of the apparatus type claims and features of the method type claims is considered as to be disclosed with this application.

BRIEF DESCRIPTION

The aspects defined above and further aspects are apparent from the examples of embodiment to be described hereinafter and are explained with reference to the examples of embodiment. The invention will be described in more detail hereinafter with reference to examples of embodiment but to which the invention is not limited, wherein.

DETAILED DESCRIPTION

Figure 1:
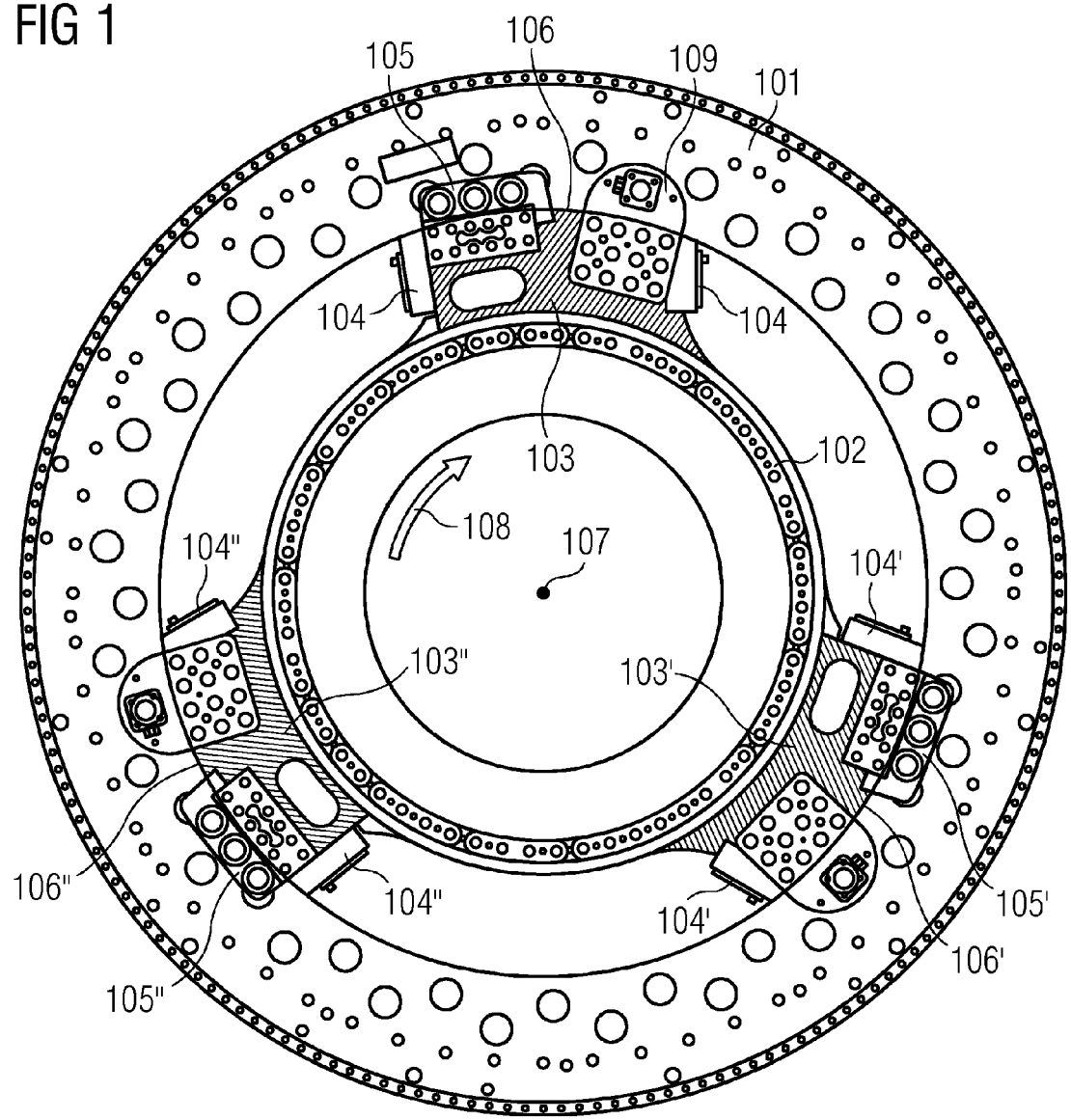
FIG. 1 shows a schematic view of a rotatable structure and a stationary structure of a wind turbine according to an exemplary embodiment.

The illustrations in the drawings are schematic. It is noted that in different figures similar or identical elements are provided with the same reference signs.

FIG. 1 shows a wind turbine comprising a first wind turbine structure which is a stationary structure and a second wind turbine structure which is a rotary structure which is rotatable with respect to the first wind turbine structure. In particular, as exemplary shown in FIG. 1, the first wind turbine structure comprises a stator frame 102 and the second wind turbine structure comprises a stiffening disc 101, such as a brake disc. To the rotatable structure, a hub with blades is coupled. The rotatable structure is rotatably coupled to the stationary structure. The stator frame 102 comprises one or a plurality of mounting sections 103, 103', 103" to which e.g. a respective caliper brake 105, 105', 105" is mountable such that the stiffening disc 101 is brakeable by the respectively mounted caliper brake 105, 105', 105".

Furthermore, to some or all of the mounting sections 103, 103', 103", one or more respective safety bearing elements 104, 104', 104" are mountable. As shown in the exemplary embodiment in FIG. 1, two safety bearing elements 104, 104', 104" are mounted to each mounting section 103, 103', 103". Between the mounting section 103, 103', 103" and the stiffening disc 101, a gap 106, 106', 106" exists under a normal operation of the wind turbine. If wind gusts, large turbulences and/or if a bearing of the generator is damaged, the distance (gap 106, 106', 106") between the mounting section 103, 103', 103" may be reduced below a predetermined reference value. If the predetermined reference value is reached, the safety bearing element 104, 104', 104" slidably contacts the stiffening disc 101 such that a sliding bearing is generated and the rotatable structure may further rotate with respect to the stationary structure. Moreover, the stator frame 102 may comprise a circular profile which comprises a center axis 107. The stiffening disc 101 may comprise a circular ring shape which comprises a rotational axis which is coaxial with the center axis 107 of the stator frame 102.

Figure 2:
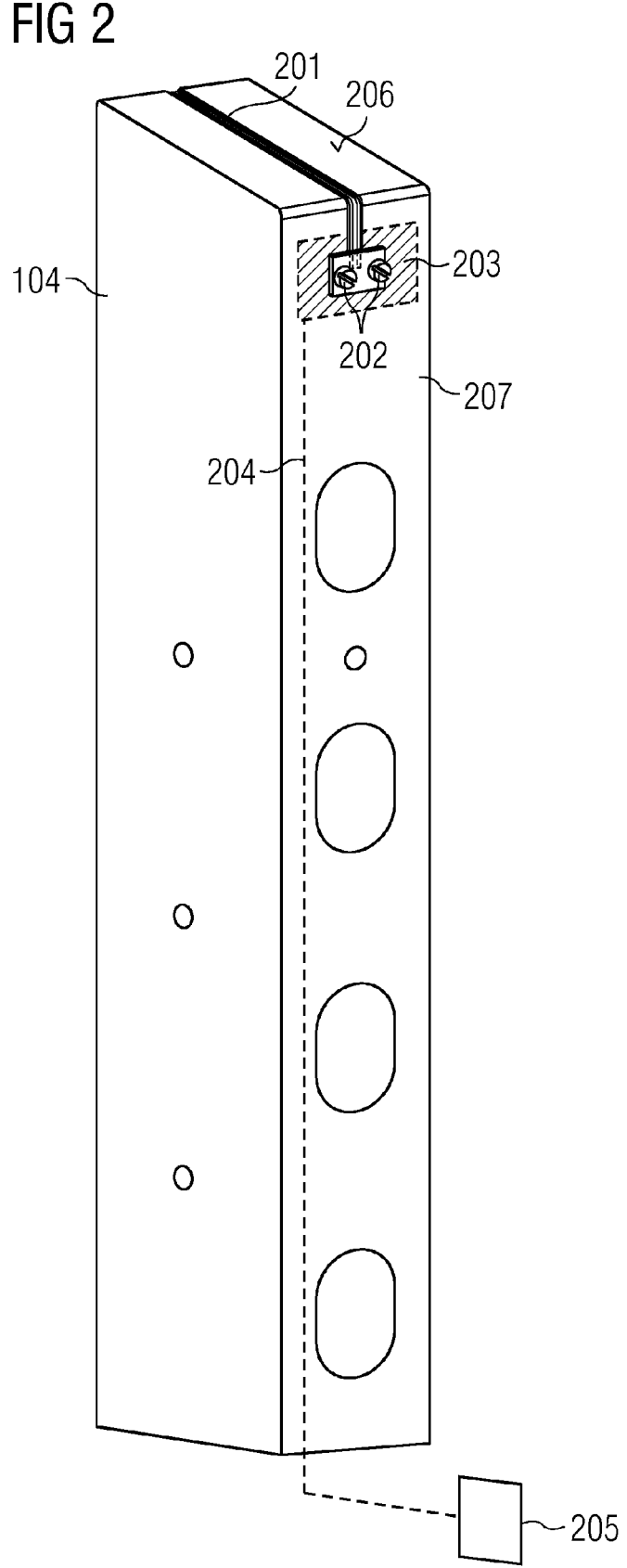
FIG. 2 shows a schematic view of a safety bearing element according to an exemplary embodiment.

The safety bearing element 104, 104', 104" comprises an electrical indicating circuitry with an indicating conductor 201 (see FIG. 2). The electrical indicating circuitry is connectable to a wear control system 205 (see FIG. 2) such that a signal is generatable by the electrical indicating circuitry and transmitted to the wear controller system 205 until the indicating conductor is damaged due to the slidable contact of the stiffening disk 101 with the safety bearing element 104, 104', 104".

Each mounting section 103, 103', 103" may comprise a respective caliper brake 105, 105', 105" which partially encloses the stiffening disc 101. Furthermore, a rotatable structure locking device 109 may be additionally attached to the mounting section 103, 103', 103". The rotatable structure locking device 109 is adapted for locking the rotatable structure to the stationary structure such that a rotation between the rotatable structure and the stationary structure is prevented if the wind turbine is in a non-operating state. The mounting sections 103, 103', 103" of the stator frame 102 are spaced apart from each other along a circumferential direction 108.

FIG. 2 shows an exemplary embodiment of a safety bearing element 104. The safety bearing element 104 may be fixed e.g. by a screw connection to the mounting section 103 of the stator frame 102. The safety bearing element 104 may further comprise large through-holes for cooling and for weight reducing purposes. Furthermore, onto the contact surface 106, the indicating conductor 201 is mounted. As shown in FIG. 2, the indicating conductor 201 may be a strip conductor (e.g. a flexprint cable) and may be glued or brazed onto the contact surface 206 of the safety bearing element 104.

Furthermore, as shown in FIG. 2, the indicating conductor 201 runs along the contact surface 206 and further along the side surfaces 207 of the safety bearing element 104. The fixing screws 202 may be screwed into respective bore holes formed within the side surfaces 207 of the safety bearing element 104 for fixing the indicating conductor 201 to the safety bearing element 104. The electrical indicating circuitry may further comprise a contact section 203 which may be formed as a (metal) contact or plate. A controller connection 204, such as a further conductor, may couple the indicating conductor 201 via the contact section 203 with a wear controller system 205. The wear controller system 205 may be located spaced apart to the safety bearing element 104 and may further be fixed to other parts of the stationary structure, such as the nacelle of the wind turbine.

The safety bearing element 104 may further comprise a signal transmitter which is fixed to the safety bearing element 104, such that a wireless signal transmission between the electrical indicating circuitry and the wear controller system 205 may be provided. The controller connection 204 may run along the surfaces, e.g. the side surface 207 or internally within the safety bearing element 104. Furthermore, the contact section 203, i.e. the metal plate contact, may be located onto the side surface 207 or may be formed internally of the safety bearing element 104. Hence, the fixing screws 202 may be electrically conductive such that the fixing screws 202 generate an electrical connection between the indicating conductor 201 and the internally located contact section 203.

FIG. 2 shows a view onto the side surface 207, wherein at an opposite side surface, which is located opposed to the side surface 207, further fixing screws 202 may fix an opposed end section of the indicating conductor 201 to the safety bearing element 104. Hence, a closed loop of the electrical indicating circuitry is provided. Moreover, if the contact surface 206 contacts the stiffening disk 101, the indicating conductor 201 breaks after a certain load and stress. If the indicating conductor 201 is broken and worn out, the electrical indicating circuitry is cut such that no signal is generated to the wear controller system 205. If a signal transmission is interrupted, the wear controller system 205 may stop the operation of the wind turbine, for example.

Figure 3:
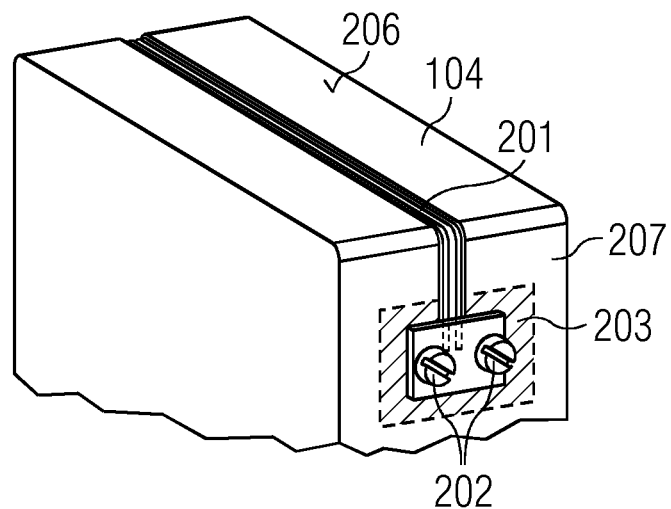
FIG. 3 shows an enlarged view of a top section of the safety bearing element according to an exemplary embodiment.

FIG. 3 shows a more detailed view of the top section of the safety bearing element 104 as shown in FIG. 2. As shown in FIG. 3, fixing screws 202 fix an end section of the indicating conductor 201 to the side surface 207 and the contact surface 206, respectively.

Figure 4:
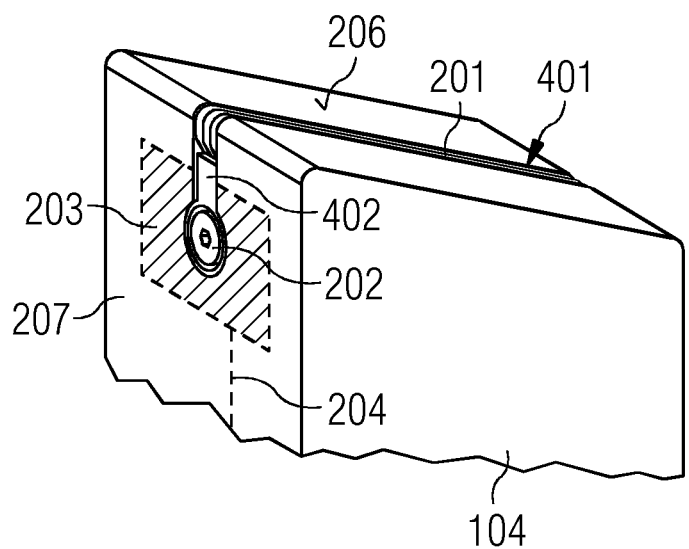
FIG. 4 shows an enlarged top view of the safety bearing element comprising a groove and a clamping terminal according to an exemplary embodiment.

FIG. 4 shows a further exemplary embodiment. In FIG. 4, the top section of the safety bearing element 104 as shown in FIG. 2 is shown. Furthermore, the contact surface 206 comprises a groove 401 (notch) into which the indicating conductor 201 is arranged. Hence, the indicating conductor 201 is located deeper inside the safety bearing element 104 than the outermost section of the contact surface 206 of the safety bearing element 104. The indicating conductor 201 is not in contact with the second wind turbine structure, i.e. the stiffening disk 101, until the material of the outermost section of the contact surface 206 is abraded and worn out by a contact with the stiffening disk 101. If the material of the safety bearing element 104 is worn out at a predefined status, the indicating conductor 201 contacts the stiffening disk 101. After the indicating conductor 201 breaks due to the contact and the friction with the stiffening disk 101, a signal which is sent to the wear controller system is interrupted.

Furthermore, as shown in FIG. 4, a clamping terminal 402 is interposed between the fixing screw 202 and an end section of the indicating conductor 201. Hence, a detachable clamping connection for clamping the indicating conductor 201 to the safety bearing element 104 is formed. The clamping terminal 402 may be in electrically conductive contact with the contact section 203. Alternatively, the clamping terminal 402 may be electrically non-conductive and the fixing screw 202 may be electrically conductive for providing an electrical conductive coupling between the indicating conductor 201 and the contact section 203. Furthermore, the safety bearing element 104 may comprise a recess in the region of the side surface 207, such that the fixing screw 202 and the clamping terminal 402 may be embedded into the safety bearing element 104 so that no parts of the fixing elements and the components of the electrical indicating circuitry protrude out of the side surface 207.

Figure 5:
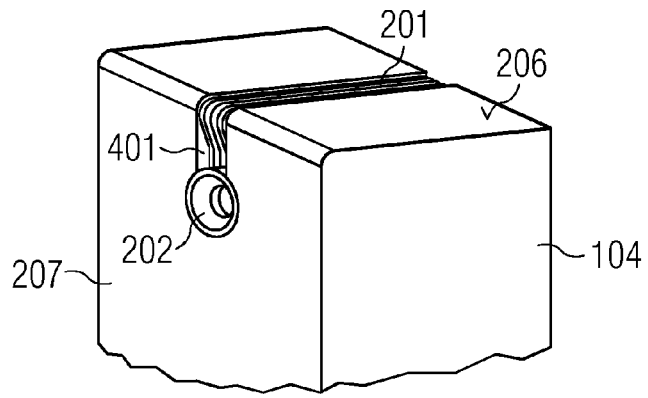
FIG. 5 shows a first perspective view of a safety bearing element comprising a clamping terminal and a further clamping terminal for fixing the indicating conductor according to an exemplary embodiment.

FIG. 5 shows a further exemplary embodiment, wherein the indicating conductor 201 is located inside the groove 401. The groove 401 is formed in such a way that the groove runs from the side surface 207 or the contact surface 206 to the further side surface which is located opposed to the side surface 207. The fixing screw 202 may be screwed into the safety bearing element 104 for fixing the indicating conductor 201 to the safety bearing element 104. The screw head of the fixing screw 202 is embedded inside the groove 401 such that the fixing screw 202 does not protrude from the side surface 207.

Figure 6:
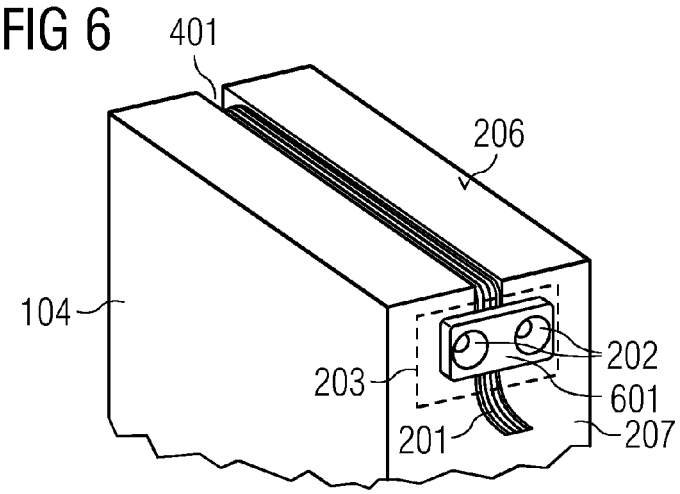
FIG. 6 shows a second perspective view of a safety bearing element comprising a clamping terminal and a further clamping terminal for fixing the indicating conductor according to an exemplary embodiment.

FIG. 6 shows a further exemplary embodiment, wherein the indicating conductor 201 is arranged within the groove 401. A further clamping terminal 601 is shown. The further clamping terminal 601 is screwed by two fixing screws 202 to the safety bearing element 104. The fixing screws 202 pass the indicating conductor 201. The indicating conductor 201 is fixed by the further clamping terminal 601 detachably to the side surface 207 of the safety bearing element 104. For example, the further clamping terminal 601 may be electrically conductive and may provide an electrical conductive coupling between the indicating conductor 201 and the contact section 203.

Figure 7:
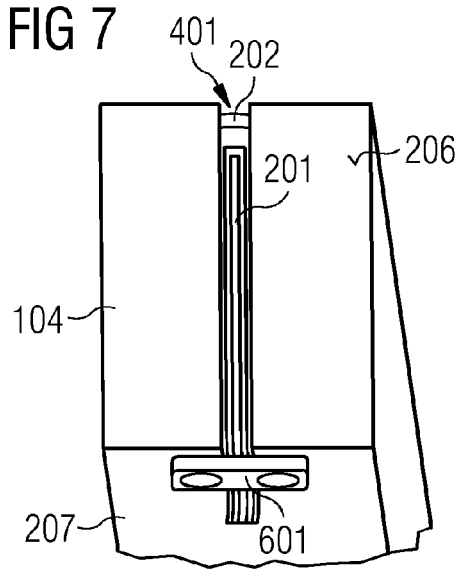
FIG. 7 shows a top view of a safety bearing element comprising a clamping terminal and a further clamping terminal for fixing the indicating conductor according to an exemplary embodiment.

FIG. 7 shows a top view of a safety bearing element 104, wherein the indicating conductor 201 is located within the groove 401. The further clamping terminal 602 clamps the one end of the indicating conductor 201 to the side surface 207. At an opposed surface with respect to the side surface 207, a fixing screw 202 fixes another end section of the indicating conductor 201 to the safety bearing element 104.

Figure 8:
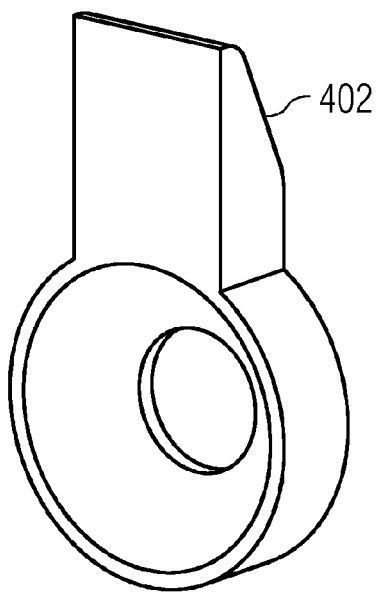
FIG. 8 shows a first perspective view of a clamping terminal according to an exemplary embodiment.
Figure 9:
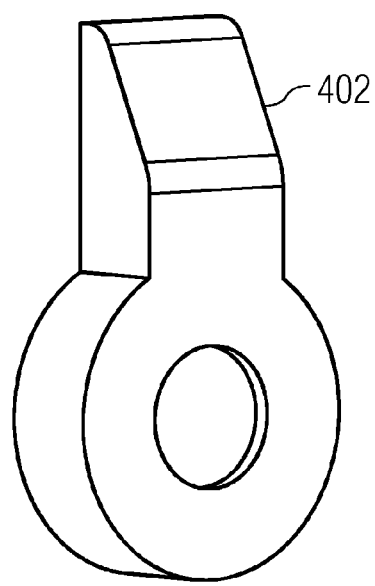
FIG. 9 shows a second perspective view of a clamping terminal according to an exemplary embodiment.

FIG. 8 and FIG. 9 show exemplary embodiments of a clamping terminal 402. The clamping terminal 402 may be fixed by fixing screws 202 to the safety bearing element.

Figure 10:
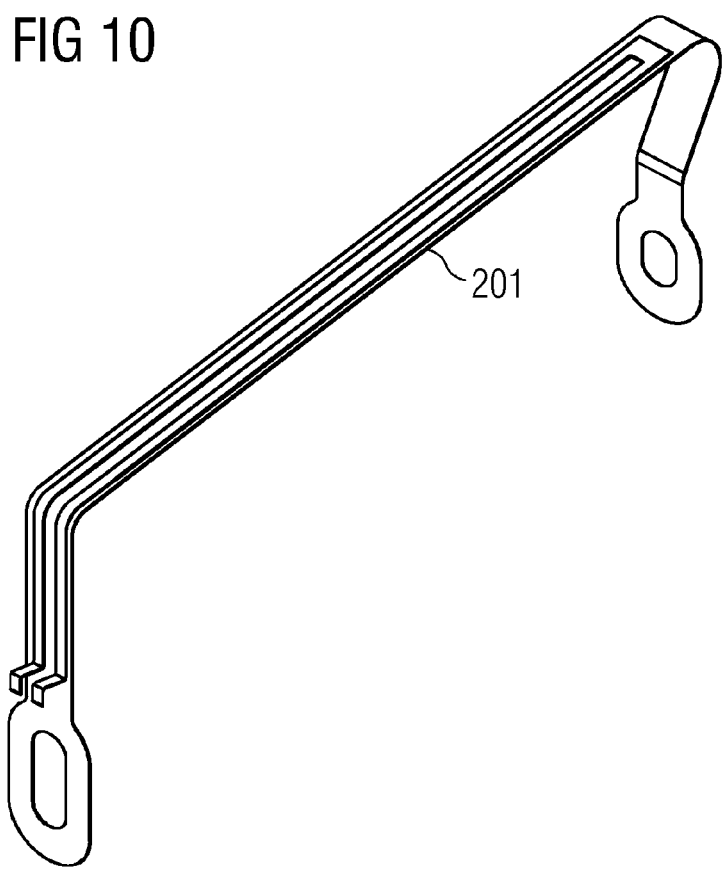
FIG. 10 shows a schematic view of an indicating conductor according to an exemplary embodiment.

FIG. 10 shows an exemplary embodiment of an indicating conductor 201 which is formed as a strip connector, i.e. as a flexprint cable. The indicating conductor 201 may form a U-shape, wherein the indicating conductor 201 envelopes a part of the side surfaces 207 of the safety bearing element 104 and may further with a centre section run along the contact surface 206 of the safety bearing element 104.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A system for a wind turbine, the system comprising;
a first wind turbine structure;
a second wind turbine structure, wherein the first wind turbine structure and the second wind turbine structure are rotatable with respect to each other; and
a safety bearing element which is mounted to the first wind turbine structure such that the second wind turbine structure is in slideable contact with a contact surface of the safety bearing element if a distance between the first wind turbine structure and the second wind turbine structure is reduced below a predetermined reference value,
wherein the safety bearing element comprises an electrical indicating circuitry with an indicating conductor, and
wherein the electrical indicating circuitry is connectable to a wear controller system such that a signal is generatable by the electrical indicating circuitry and transmitted to the wear controller system until the indicating conductor is damaged due to the slideable contact of the second wind turbine structure with the safety bearing element;
wherein the second wind turbine structure surrounds the first wind turbine structure.

2. The system according to claim 1, wherein the indicating conductor is mounted onto the contact surface.

3. The system according to claim 1, wherein the safety bearing element comprises a groove which is formed within the contact surface, wherein the indicating conductor is arranged within the groove.

4. The system according to claim 1, wherein the indicating conductor is a wire.

5. The system according to claim 4, wherein the indicating conductor is glued or braced to the safety bearing element.

6. The system according to claim 4, further comprising:
a fixing screw,
wherein the safety bearing element comprises a bore hole, and
wherein the fixing screw is screwable into the bore hole for fixing the indicating conductor to the safety bearing element in a detachable manner.

7. The system according to claim 6, wherein the fixing screw is electrically conductive.

8. The system according to claim 6, wherein a contact section of the safety bearing element into which the bore hole is formed is made of an electrically conductive material, and wherein the contact section forms a part of the electrical indicating circuitry and is electrically connectable to the wear controller system.

9. The system according to claim 6, further comprising:
an electrically conductive clamping terminal which is mountable to the safety bearing element by the fixing screw, and
wherein the indicating conductor is clamped between the electrically conductive clamping terminal and the safety bearing element.

10. The system according to claim 1, wherein the first wind turbine structure is a stationary structure being coupled to a generator stator and comprising a stator frame,
wherein the second wind turbine structure is a rotatable structure being coupled to a hub of the wind turbine and to a generator rotor and comprising a stiffening disc, and
wherein the safety bearing element is mounted to the stator frame such that the stiffening disc is in slideable contact with the contact surface of the safety bearing element if a distance between the stator frame and the stiffening disc is reduced below a predetermined reference value.

11. The system according to claim 1, wherein the safety bearing element is formed of a material which is softer than a material of the second wind turbine structure.

12. A wind turbine with a system according to claim 1.

13. The system according to claim 1, wherein the indicating conductor is a strip conductor.

14. A method for operating a wind turbine, the method comprising:
rotating a first wind turbine structure with respect to a second wind turbine structure, wherein a safety bearing element is mounted to the first wind turbine structure such that the second wind turbine structure is in slideable contact with a sliding surface of the safety bearing element if a distance between the first wind turbine structure and the second wind turbine structure is reduced below a predetermined reference value;
generating a signal to a wear controller system until an indicating conductor is damaged due to the slideable contact of the second wind turbine structure with the safety bearing element,
wherein the safety bearing element comprises an electrical indicating circuitry with the indicating conductor,
wherein the electrical indicating circuitry is connectable to the wear controller system;
wherein the second wind turbine structure surrounds the first wind turbine structure.

* * * * *